United States Patent

Itoh et al.

[11] Patent Number: 5,830,103
[45] Date of Patent: Nov. 3, 1998

[54] TOROIDAL TYPE CONTINUOUSLY VARIABLE TRANSMISSION

[75] Inventors: Hiroyuki Itoh; Hisashi Machida; Nobuo Gotoh; Takashi Imanishi, all of Fujisawa, Japan

[73] Assignee: NSK Ltd., Tokyo, Japan

[21] Appl. No.: 862,921

[22] Filed: May 27, 1997

[30] Foreign Application Priority Data

May 29, 1996 [JP] Japan .................................. 8-135383

[51] Int. Cl.$^6$ ............................ F16H 15/38; F16H 57/04
[52] U.S. Cl. .................... 476/8; 476/40; 476/46
[58] Field of Search .................. 476/8, 10, 40, 476/42, 46

[56] References Cited

U.S. PATENT DOCUMENTS 5,136,890  8/1992  Hibi et al. ............................... 476/10

FOREIGN PATENT DOCUMENTS

| 62-71465 | 5/1987 | Japan . |
| 1-173552 | 12/1989 | Japan . |
| 8-35552 | 2/1996 | Japan . |
| 8-291850 | 11/1996 | Japan . |

Primary Examiner—Allan D. Herrmann
Attorney, Agent, or Firm—Shapiro and Shapiro

[57] ABSTRACT

A sufficient quantity of lubricating oil can be sent into a radial needle bearing and a thrust ball bearing supporting a power roller. The lubricating oil is discharged into a gap space through a send-in side oil supply path formed in a trunnion, and is sent into a receiving side oil supply path in a pivotal support shaft portion. A thrust sliding bearing having a through-hole is provided in the gap space. The downstream end opening of the send-in side oil supply path and the upstream end opening of the receiving side oil supply path are located inside the through-hole.

3 Claims, 7 Drawing Sheets

TOROIDAL TYPE CONTINUOUSLY VARIABLE TRANSMISSION

BACKGROUND OF THE INVENTION

1. Field of the Invention

A toroidal type continuously variable transmission according to this invention is utilized, for example, as a transmission for an automobile or a transmission for various industrial machines.

2. Related Background Art

It has been studied to use a toroidal type continuously variable transmission as schematically shown in FIGS. 5 and 6 of the accompanying drawings as a transmission for an automobile. This toroidal type continuously variable transmission is such that as disclosed, for example, in Japanese Laid-Open Utility Model Application No. 62-71465, as input side disc (a first disc) 2 is supported coaxially with an input shaft 1 and an output side disc (a second disc) 4 is fixed to the end portion of an output shaft 3 disposed coaxially with the input shaft 1. Inside a casing containing the toroidal type continuously variable transmission therein, there are provided trunnions 6, 6 pivotable about pivot shafts 5, 5 located at twisted positions relative to the input shaft 1 and the output shaft 3.

These trunnions 6, 6 are provided with the pivot shafts 5, 5 on the outer sides of the opposite end portions thereof. Also, the base end portions of displaceable shafts 7, 7 are supported on the intermediate portions of these trunnions 6, 6 and the trunnions 6, 6 are pivotally moved about the pivot shafts 5, 5, whereby the angles of inclination of the displaceable shafts 7, 7 are made adjustable. Power rollers 8, 8 are rotatably supported around the displaceable shafts 7, 7 supported by the trunnions 6, 6. The power rollers 8, 8 are sandwiched between the inner sides 2a and 4a of the input side and output side discs 2 and 4.

The inner sides 2a and 4a of the input side and output side discs 2 and 4 which are opposed to each other have their cross-sections formed into concave surfaces obtained by circular axes centering around the pivot shafts 5 being rotated. The peripheral surfaces 8a, 8a of the power rollers 8, 8 which are formed into spherical convex surfaces bear against the inner sides 2a and 4a.

A loading cam type pressing device 9 is provided between the input shaft 1 and the input side disc 2, and the input side disc 2 is resiliently pressed toward the output side disc 4 by this pressing device 9. This pressing device 9 is comprised of a cam plate 10 rotatable with the input shaft 1, and a plurality of (e.g. four) rollers 12, 12 held by a holder 11. A cam surface 13 which is a concave-convex surface extending in the circumferential direction is formed on one side (the left side as viewed in FIGS. 5 and 6) of the cam plate 10, and a similar cam surface 14 is formed on the outer side (the right side as viewed in FIGS. 5 and 6) of the input side disc 2. The plurality of rollers 12, 12 are supported for rotation about radial axes relative to the center of the input shaft 1.

When during the use of the toroidal type continuously variable transmission constructed as described above, the cam plate 10 rotates with the rotation of the input shaft 1, the plurality of rollers 12, 12 are pressed against the cam surface 14 formed on the outer side of the input side disc 2 by the cam surface 13. As a result, the input side disc 2 is pressed against the plurality of power rollers 8, 8 and at the same time, the input side disc 2 is rotated on the basis of the pair of cam surfaces 13, 14 and the plurality of rollers 12, 12 being pressed against one another. This rotation of the input side disc 2 is transmitted to the output side disc 4 through the plurality of power rollers 8, 8, whereby the output shaft 3 fixed to the output side disc 4 is rotated.

When the rotational speed ratio (transmission gear ratio) between the input shaft 1 and the output shaft 3 is to be changed and deceleration is first to be effected between the input shaft 1 and the output shaft 3, the trunnions 6, 6 are pivotally moved in a predetermined direction about the pivot shafts 5, 5. The displaceable shafts 7, 7 are then inclined so that as shown in FIG. 5, the peripheral surfaces 8a, 8a of the power rollers 8, 8 may bear against that portion of the inner side 2a of the input side disc 2 which is toward the center and that portion of the inner side 4a of the output side disc 4 which is toward the outer periphery, respectively.

Conversely, when acceleration is to be effected, the trunnions 6, 6 are pivotally moved in the opposite direction about the pivot shafts 5, 5. The displaceable shafts 7, 7 are then inclined so that as shown in FIG. 6, the peripheral surfaces 8a, 8a of the power rollers 8, 8 may bear against that portion of the inner side 2a of the input side disc 2 which is toward the outer periphery and that portion of the inner side 4a of the output side disc 4 which is toward the center, respectively. If the angle of inclination of the displaceable shafts 7, 7 is made intermediate of FIGS. 5 and 6, there will be obtained a medium transmission gear ratio between the input shaft 1 and the output shaft 3.

Further, FIGS. 7 and 8 of the accompanying drawings show a more specific toroidal type continuously variable transmission described in Japanese Utility Model Application No. 63-69293 (Japanese Laid-Open Utility Model Application No. 1-173552). An input side disc 2 and an output side disc 4 are rotatably supported around a tubular input shaft 15 through needle bearings 16, 16. Also, a cam plate 10 is spline-engaged with the outer peripheral surface of an end portion (the left end portion as viewed in FIG. 7) of the input shaft 15 and hampers the movement thereof away from the input side disc 2 by a flange portion 17. This cam plate 10 and rollers 12, 12 together constitute a loading cam type pressing device 9 for rotating the input side disc 2 on the basis of the rotation of the input shaft 15 while pressing it toward the output side disc 4. An output gear 18 is coupled to the output side disc 4 by keys 19, 19 so that the output side disc 4 and the output gear 18 may rotate in synchronism with each other.

The opposite end portions of a pair of trunnions 6, 6 are supported on a pair of support plates 20, 20 for pivotal movement and displacement in the axial direction (the front to back direction of FIG. 7, and the right to left direction as viewed in FIG. 8). Displaceable shafts 7, 7 are supported in circular holes 23, 23 formed in the intermediate portions of the trunnions 6, 6. These displaceable shafts 7, 7 have support shaft portions 21, 21 and pivotal support shaft portions 22, 22 which are parallel to each other and eccentric with respect to each other. The support shaft portions 21, 21 are rotatably supported inside the circular holes 23, 23 through radial needle bearings 24, 24. Power rollers 8, 8 are rotatably supported around the pivotal support shaft portions 22, 22 through radial needle bearings 25, 25 which are rolling bearings for supporting these power rollers 8, 8.

The pair of displaceable shafts 7, 7 are provided at opposite positions of 180° relative to the input shaft 15. Also, the directions in which the pivotal support shaft portions 22, 22 of these displaceable shafts 7, 7 are eccentric with respect to the support shaft portions 21, 21 are the same direction (the rightwardly and leftwardly opposite directions as viewed in FIG. 8) with respect to the direction of rotation of the input side and output side discs 2 and 4. Also, the direction of eccentricity is a direction substantially orthogonal to the direction of disposition of the input shaft 15. Accordingly, the power rollers 8, 8 are supported for some displacement in the direction of displacement of the input shaft 15. As a result, this displacement can be absorbed without any unreasonable force being imparted to each component even when the power rollers 8, 8 tend to be displaced in the axial direction of the input shaft 15 (the right to left direction as viewed in FIG. 7, and the front to back direction as viewed in FIG. 8) due to the irregularity of the dimensional accuracy or the resilient deformation or the like of each component.

Also, between the outer sides of the power rollers 8, 8 and the inner sides of the intermediate portions of the trunnions 6, 6, thrust ball bearings 26, 26 which are rolling bearings for supporting the power rollers 8, 8 and thrust needle bearings 27, 27 which are needle roller thrust bearings for supporting a thrust load applied to outer races 30, 30 which will be described below are provided in succession from the outer sides of the power rollers 8, 8. The thrust ball bearings 26, 26 permit the rotation of the rollers 8, 8 while supporting a load in the thrust direction applied to the power rollers 8, 8. Such thrust ball bearings 26, 26 are comprised of a plurality of balls 29, 29, circular ring-like retainers 28, 28 retaining the balls 29, 29 for rolling, and circular ring-like outer races 30, 30 (power roller thrust bearing outer races) which are thrust races. The inner race tracks of the thrust ball bearings 26, 26 formed on the outer sides of the power rollers 8, 8, and the outer race tracks of the thrust ball bearings 26, 26 are formed on the inner sides of the outer races 30, 30.

Also, the thrust needle bearings 27, 27 are comprised of a race 31, a retainer 32 and needles 33, 33. The race 31 and the retainer 32 are combined together for some displacement in the direction of rotation. Such thrust needle bearings 27, 27 are sandwiched between the inner sides of the trunnions 6, 6 and the outer sides of the outer races 30, 30 with the races 31, 31 made to bear against the inner sides. Such thrust needle bearings 27, 27 permit the pivotal support shaft portions 22, 22 and the outer races 30, 30 to pivotally move about the support shaft portions 21, 21 while supporting a thrust load applied from the power rollers 8, 8 to the outer races 30, 30.

Further, driving rods 36, 36 are coupled to one end portion (the left end portion as viewed in FIG. 8) of the trunnions 6, 6 and driving pistons 37, 37 are secured to the outer peripheral surfaces of the intermediate portions of these driving rods 36, 36. These driving pistons 37, 37 are oil-tightly fitted in driving cylinders 38, 38.

In the case of the toroidal type continuously variable transmission constructed as described above, the rotation of the input shaft 15 is transmitted to the input side disc 2 through the pressing device 9. The rotation of this input side disc 2 in turn is transmitted to the output side disc 4 through the pair of power rollers 8, 8, and the rotation of this output side disc 4 in turn is taken out from the output gear 18.

When the rotational speed ratio between the input shaft 15 and the output gear 18 is to be changed, the pair of driving pistons 37, 37 are displaced in opposite directions. With the displacement of these driving pistons 37, 37, the pair of trunnions 6, 6 are displaced in opposite directions, whereby for example, the power roller 8 on the lower side of FIG. 8 is displaced rightwardly as viewed in FIG. 8 and the power roller 8 on the upper side of FIG. 8 is displaced leftwardly as viewed in FIG. 8. As a result, the direction of a force in the tangential direction acting on the portions of contact between the peripheral surfaces 8a, 8a of the power rollers 8, 8 and the inner sides 2a and 4a of the input side disc 2 and the output side disc 4, respectively, changes. With this change in the direction of the force, the trunnions 6, 6 pivotally move in opposite directions about the pivot shafts 5, 5 pivotally supported by the support plates 20, 20. As a result, as shown in FIGS. 5 and 6, the positions of contact between the peripheral surfaces 8a, 8a of the power rollers 8, 8 and the inner sides 2a, 4a change, and the rotational speed ratio between the input shaft 15 and the output gear 18 changes.

When the transmission of the rotational force is thus effected between the input shaft 15 and the output gear 18, the power rollers 8, 8 are displaced axially of the input shaft 15 on the basis of the resilient deformation of each constituent member, and the displaceable shafts 7, 7 pivotally supporting these power rollers 8, 8 are slightly pivotally moved about the support shaft portions 21, 21. As a result of this pivotal movement, the outer sides of the outer races 30, 30 of the thrust ball bearings 26, 26 and the inner sides of the trunnions 6, 6 are displaced relative to each other. Since the thrust needle bearings 27, 27 are present between the outer sides and the inner sides, the force required for this relative displacement is small. Accordingly, the force for varying the angle of inclination of the displaceable shafts 7, 7 may be small.

In the case of the toroidal type continuously variable transmission constructed and acting as described above, it is necessary to send lubricating oil into the radial needle bearing 25 and thrust ball bearing 26 for supporting the power rollers 8, 8. This is because during the operation of the toroidal type continuously variable transmission, the power rollers 8, 8 rotate at a high speed while being subjected to a gear load. Accordingly, to secure the durability of the radial needle bearing 25 and thrust ball bearing 26, it is necessary to send a sufficient quantity of lubricating oil into these two bearings 25 and 26.

For this reason, heretofore, a send-in side oil supply path 39 (see FIG. 8 and FIGS. 1, 3 and 4 showing some embodiments of the present invention) was formed in the trunnion 6 and also, oil supply holes 40, 40 were formed in the outer race 30 constituting the thrust ball bearing 26, thereby making it possible to send lubricating oil into this thrust ball bearing 26. Also, design was made such that lubricating oil was sent into the radial needle bearing 25 through a receiving side oil supply path 41 (see FIGS. 1 and 3 showing the embodiments of the present invention) provided inside the pivotal support shaft portion 22 constituting the first half of the displaceable shaft 7. The upstream end of this receiving side oil supply path 41 opens to a portion of the base end surface 43 of the pivotal support shaft portion 22 which is off the support shaft portion 21.

During the operation of the toroidal type continuously variable transmission, the lubricating oil is sent into the send-in side oil supply path 39 by the action of a pump, not shown, incorporated in this transmission. This lubricating oil first flows out from the downstream end opening of the send-in side oil supply path 39 into the gap space between the outer side of the outer race 30 constituting the thrust ball bearing 26 and the inner side of the trunnion 6. Further, this lubricating oil is sent to the thrust ball bearing 26 through the oil supply holes 40, 40 and to the radial needle bearing 25 through the receiving side oil supply path 41, and lubricates these two bearings 26 and 25.

In the case of the prior-art structure as described above, it was difficult to secure the quantity of lubricating oil sent to the thrust ball bearing 26 through the oil supply holes 40, 40 and to the radial needle bearing 25 through the receiving side oil supply path 41 sufficiently. This is attributable to the fact that a thrust needle bearing 27 is present in the gap space between the outer side of the outer race 30 constituting the thrust ball bearing 26 and the inner side of the trunnion 6.

That is, this thrust needle bearing 27 is for permitting the outer race 30 to be displaced about the support shaft portion 21 of the displaceable shaft 7, and comprises a plurality of needles 33, 33 disposed radially about the support shaft portion 21. Therefore, a gap space of large cross-sectional area is present between adjacent ones of the needles 33, 33. As a result, much of the lubricating oil discharged from the send-in side oil supply path 39 to that portion of the aforementioned gap space which is toward the center is lost diametrically outwardly of the gap space through the thrust needle bearing 27.

As a result of much of the lubricating oil discharged into the gap space being thus lost without entering the oil supply holes 40, 40 and the receiving side oil supply path 41, the quantity of lubricating oil sent to the thrust ball bearing 26 and the radial needle bearing 25 through the oil supply holes 40 and the receiving side oil supply path 41 becomes small. Therefore, there arises the possibility of the bad lubrication of the bearings 26 and 25 being caused.

In contrast with this, in Japanese Laid-Open Patent Application No. 8-35552, there is described an invention in which an annular seal member is provided in the gap space, whereby the lubricating oil discharged from the send-in side oil supply path 39 to that portion of the gap space which is toward the center is efficiently directed to the receiving side oil supply path 41. According to such structure, the quantity of lubricating oil sent to the thrust ball bearing 26 and the radial needle bearing 25 can be secured to thereby prevent these bearings from being badly lubricated. However, in the case of the invention described in this publication, the work of installing the seal member at a predetermined location while securing the load capacity of the needle roller thrust bearing provided between the inner side of the trunnion 6 and the outer side of the outer race 30 is cumbersome, and this may lead to an increase cost. The toroidal type continuously variable transmission of the present invention has been invented to suppress such rise of cost and yet eliminate the bad lubrication due to the causes as described above.

SUMMARY OF THE INVENTION

The toroidal type continuously variable transmission of the present invention, like the above-described toroidal type continuously variable transmission according to the prior art, is provided with first and second discs rotatably supported coaxially with each other with their inner sides opposed to each other, a trunnion pivotally movable about a pivot shaft lying at a twisted position relative to the center axes of the first and second discs, a displaceable shaft comprising a support shaft portion and a pivotal support shaft portion eccentric with respect to each other, the support shaft portion being rotatably supported on the trunnion, the pivotal support shaft portion being protruded from the inner side of the trunnion, a power roller rotatably supported around the pivotal support shaft portion through a rolling bearing and sandwiched between the inner sides of the first and second discs, a needle roller thrust bearing provided between the outer side of a thrust race constituting the rolling bearing and the inner side of the trunnion, and supporting a load in a thrust direction applied from the power roller to the thrust race and yet permitting the displacement of the thrust race relative to the trunnion, a receiving side oil supply path provided in the pivotal support shaft portion, and a send-in side oil supply path provided in the trunnion. Also, in the case of the toroidal type continuously variable transmissions according to the present invention, the upstream end of the receiving side oil supply path opens to that portion of the base end surface of the pivotal support shaft portion which is off the support shaft portion, and the downstream end of the send-in side oil supply path opens to the inner side of the trunnion.

Particularly, in the toroidal type continuously variable transmission according to one aspect of the invention, a thrust sliding bearing is provided between the inner side of the trunnion and that portion of the base end surface of the pivotal support shaft portion which is off the support shaft portion, and a through-hole for communicating the receiving side oil supply path and the send-in side oil supply path with each other is provided in that portion of the thrust sliding bearing which is aligned with the upstream end opening of the receiving side oil supply path and the downstream end opening of the send-in side oil supply path.

Also, in the toroidal type continuously variable transmission according to another aspect of the invention, the inner diameter of the end opening of the receiving side oil supply path opening to that portion of the base end surface of the pivotal support shaft portion which is off the support shaft portion is made large to thereby keep the end opening of the receiving side oil supply path and the end opening of the send-in side oil supply path opposed to each other, irrespective of the pivotal displacement of the pivotal support shaft portion about the support shaft portion.

Further, in the toroidal type continuously variable transmission according to further aspect of the invention, the receiving side oil supply path passes through the interior of the displaceable shaft and opens to the outer peripheral surface of the intermediate portion of the support shaft portion. The downstream end of the send-in side oil supply path and the upstream end of the receiving side oil supply path communicate with each other through the interior of a radial bearing provided between the inner peripheral surface of a circular hole formed in the trunnion to pivotally support the support shaft portion and the outer peripheral surface of the support shaft portion.

The toroidal type continuously variable transmission of the present invention constructed as described above effects the transmission of a rotational force between the first disc and the second disc on the basis of action similar to that of the aforedescribed toroidal type continuously variable transmission according to the prior art, and further changes the angle of inclination of the trunnion to thereby change the rotational speed ratio between the two discs.

Particularly, in the case of the toroidal type continuously variable transmission of the present invention, the lubricating oil discharged from the downstream end of the send-in side oil supply path provided on the trunnion side is substantially intactly sent from the upstream end opening of the receiving side oil supply path into the receiving side oil supply path without being lost into the surroundings. The lubricating oil is then sent from this receiving side oil supply path to the rolling bearing for supporting the power roller. Accordingly, much of the lubricating oil sent through the send-in side oil supply path is sent to the rolling bearing and sufficiently lubricates this rolling bearing. Also, in order to realize the structure for sending the lubricating oil from the downstream end of the send-in side oil supply path into the upstream end opening of the receiving side oil supply path, it is not required to sacrifice the load capacity of the needle roller thrust bearing provided between the inner side of the trunnion and the outer side of the thrust race or the cumbersome mounting work is not required. Accordingly, the cost does not increase.

DESCRIPTION OF THE PREFERRED EMBODIMENTS

Figure 1:
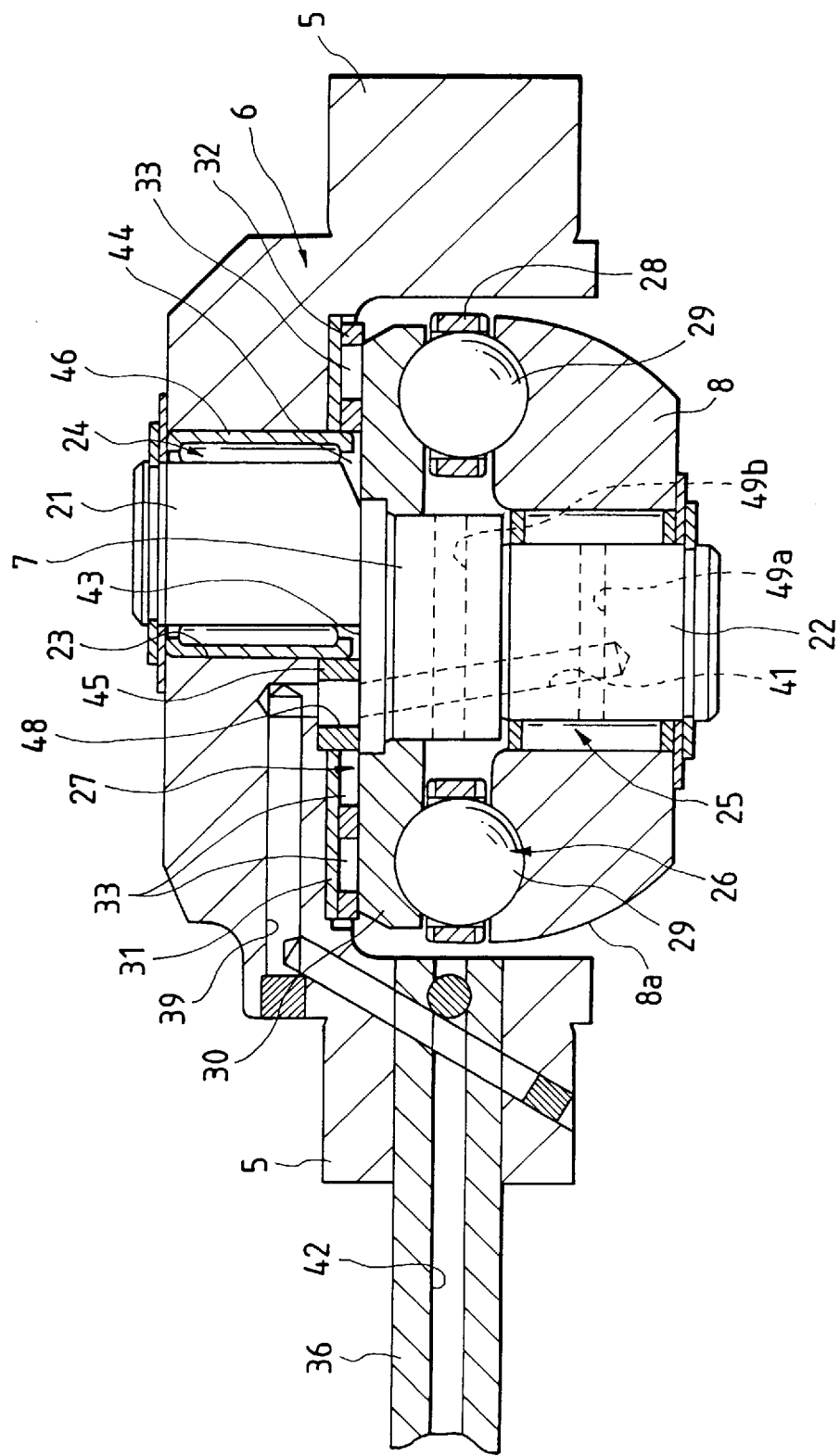
FIG. 1 is a cross-sectional view of the essential portions of a first embodiment of the present invention.
Figure 2:
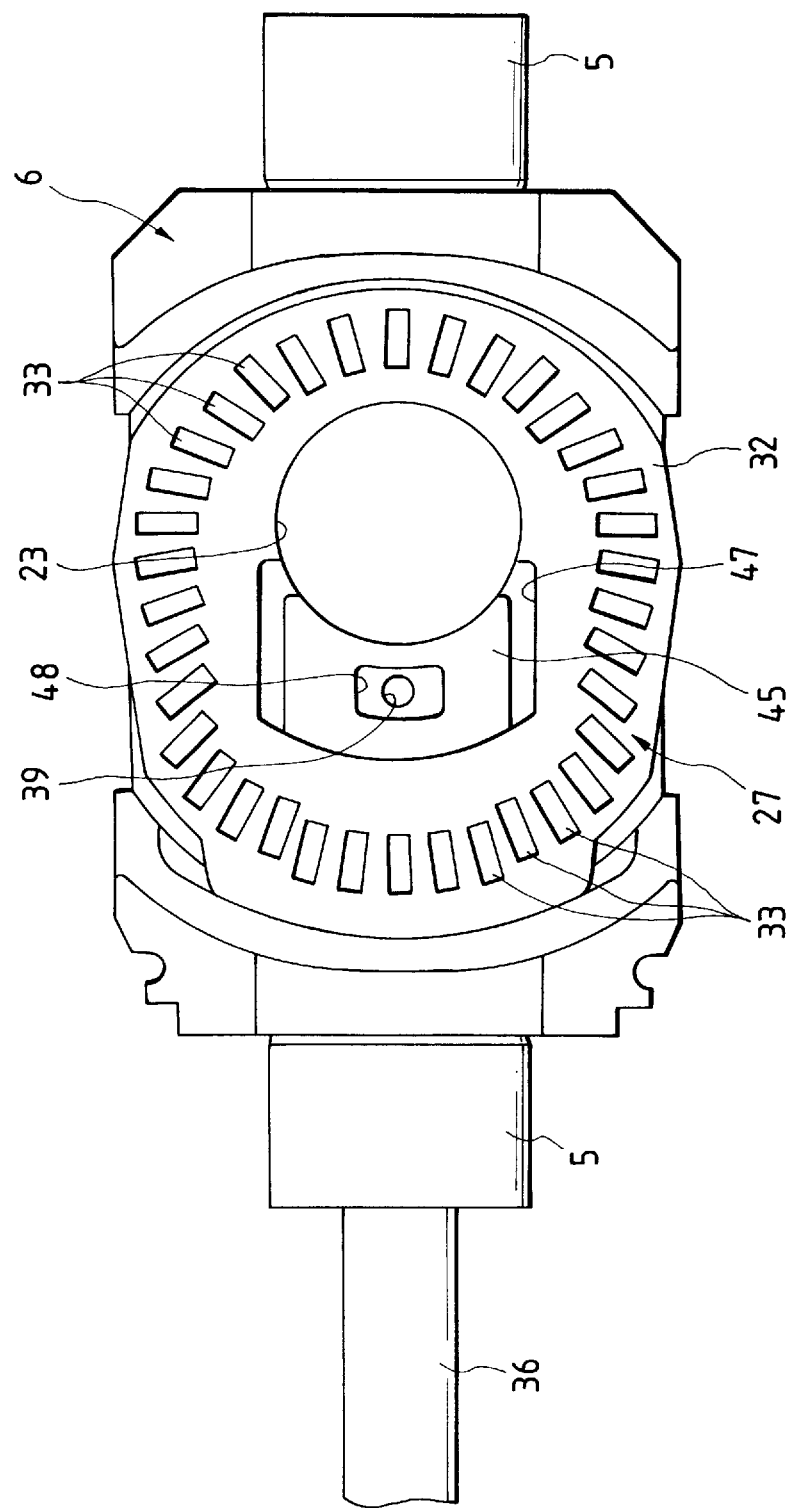
FIG. 2 is a view of the first embodiment as it is seen from below FIG. 1 with a power roller, a displaceable shaft and a thrust ball bearing omitted.

FIGS. 1 and 2 show a first embodiment of the present invention. The feature of the present invention resides in the structure of a portion which secures the load capacity of a thrust needle bearing 27 provided between the inner side of a trunnion 6 and the outer side of an outer race which is a thrust race, and yet sends lubricating oil sent through a send-in side oil supply path 39 provided in the trunnion 6 into a radial needle bearing 25 and a thrust ball bearing 26 which are rolling bearings for supporting a power roller 8. The structure and action of the other portions are similar to those of the aforedescribed prior art and therefore, duplicate description will be omitted or simplified and chiefly the characteristic portions of the present invention will hereinafter be described.

One end (the left end as viewed in FIG. 1) of the send-in side oil supply path 39 provided in the trunnion 6 communicates with an oil supply path 42 provided in a driving rod 36 for displacing the trunnion 6 in the axial direction thereof (the right to left direction as viewed in FIG. 1), and the lubricating oil can be sent into the send-in side oil supply path 39 through the oil supply path 42. Also, an opening in the other end (the right end as viewed in FIG. 1) of the send-in side oil supply path 39 is opposed to a portion of the base end surface 43 of a pivotal support shaft portion 22 constituting a displaceable shaft 7 which is off a support shaft portion 21. On the other hand, a receiving side oil supply path 41 is provided in the pivotal support shaft portion 22, and the upstream end of this receiving side oil supply path 41 opens to a portion of the base end surface 43 of the pivotal support shaft portion 22 which is off the support shaft portion 21.

A thrust sliding bearing 45 as shown in FIG. 2 is held in a portion of the gap space 44 between the inner side of the trunnion 6 and the outer side of an outer race 30 constituting the thrust ball bearing 26 which is between the base end surface 43 and the inner side of the trunnion 6. This thrust sliding bearing 45 is made of slippery synthetic resin such as nylon, polyacetal or polytetrafluoroethylene (PTFE), a metal having a self-lubricating property such as copper, silver or oil-containing metal, or a sintered material of a material having a lubricating property such as boron nitride. Such a thrust sliding bearing 45 is retained in a retaining hole 47 formed in a retainer 32 constituting the thrust needle bearing 27 and is pivotally movable about the support shaft portion 21 of the displaceable shaft 7. That is, the inner peripheral edge (the right end edge as viewed in FIGS. 1 and 2) of the thrust sliding bearing 45 is arcuate about the support shaft portion 21 and displaceably frictionally contacts with the outer peripheral surface of an outer race 46 constituting a radial needle bearing 24 for pivotally supporting the support shaft portion 21.

The outer peripheral edge (the left end edge as viewed in FIGS. 1 and 2) of the thrust sliding bearing 45 and the inner peripheral edge of the retaining hole 47 opposed to the outer peripheral edge are also arcuate about the support shaft portion 21. Further, a circumferentially long through-hole 48 centering around the support shaft portion 21 is formed in the central portion of the thrust sliding bearing 45. The upstream end opening of the receiving side oil supply path 41 and the downstream end opening of the send-in side oil supply path 39 are located inside the through-hole 48.

In the case of the toroidal type continuously variable transmission of the present invention constructed as described above, the lubricating oil discharged from the downstream end of the send-in side oil supply path 39 provided on the trunnion 6 side into the through-hole 48 in the central portion of the thrust sliding bearing 45 is intactly sent from the upstream end opening of the receiving side oil supply path 41 into the receiving side oil supply path 41 without being intercepted by the thrust sliding bearing 45 and lost in the surroundings. Branch-off flow path 49a and 49b reaching the inner diameter portions of the radial needle bearing 25 and the thrust ball bearing 26, respectively, are formed in the downstream end portion and intermediate portion, respectively, of the receiving side oil supply path 41. Accordingly, the lubricating oil sent into the receiving side oil supply path 41 is sent to the bearings 25 and 26 through the branch-off flow paths 49a and 49b. As a result, much of the lubricating oil sent through the send-in side oil supply path 39 is sent to the bearings 25 and 26, whereby these two bearings 25 and 26 can be sufficiently lubricated.

Also, the structure of the present embodiment can be easily assembled simply by forming the retaining hole 47 in the retainer 32 constituting the thrust needle bearing 27, and inserting the thrust sliding bearing 45 into this retaining hole 47. Accordingly, it never happens that the assembling work becomes cumbersome and the cost increases. Also, part of the thrust load transmitted from the power roller 8 to the displaceable shaft 7 through the thrust ball bearing 26 is supported by the thrust sliding bearing 45 and therefore, the load capacity of the needle roller thrust bearing can be secured sufficiently. The thrust load taken in charge by the thrust sliding bearing 45 is limited and moreover, this bearing is provided in a portion near the center of displacement and is low in sliding speed. Therefore, the frictional loss in the thrust sliding bearing 45 portion is very much limited to such a degree as will not pose any practical problem.

Figure 3:
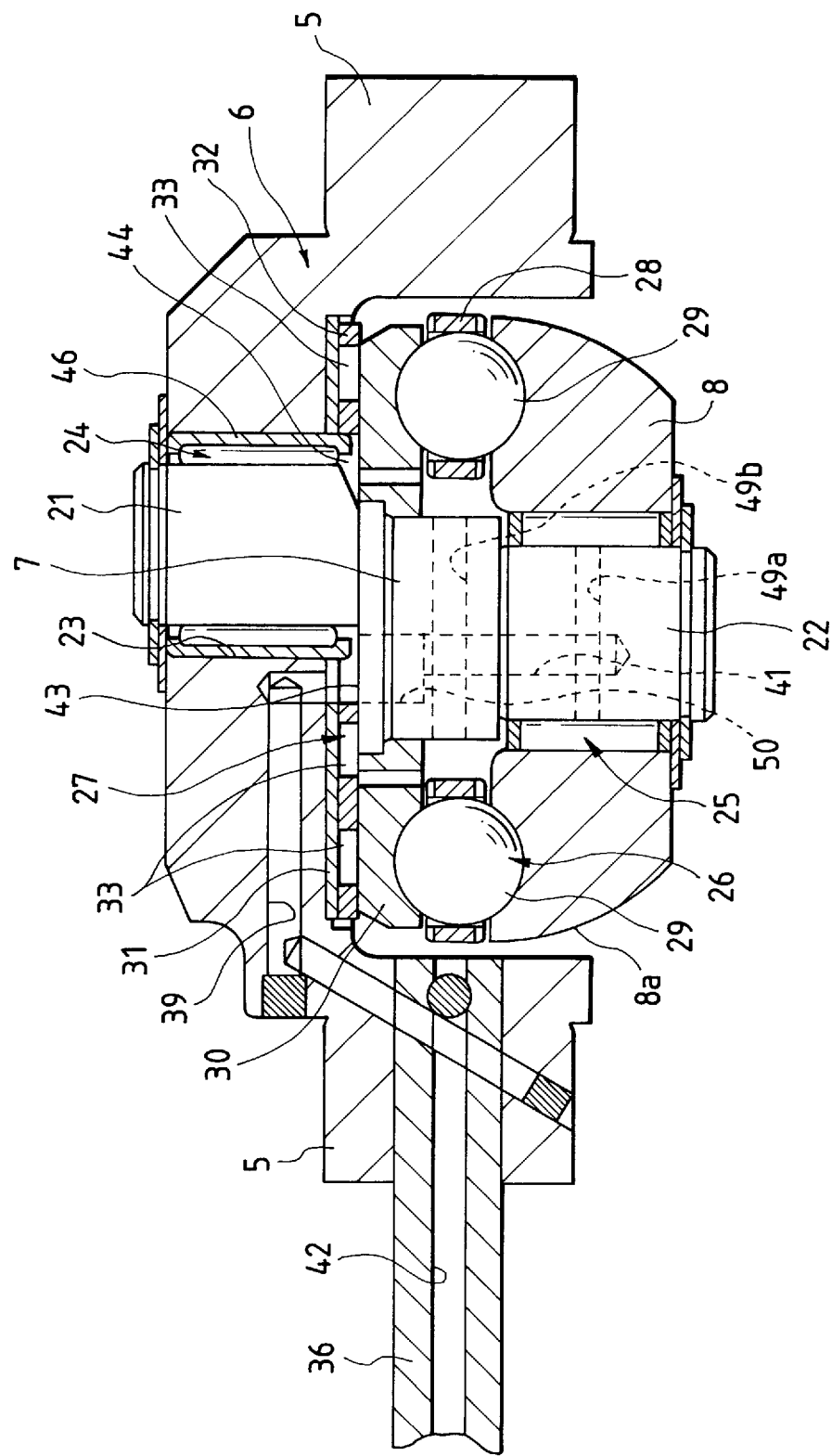
FIG. 3 is a cross-sectional view of the essential portions of a second embodiment of the present invention.

FIG. 3 shows a second embodiment of the present invention. The end portion of the receiving side oil supply path 41 opens to that portion of the base end surface 43 of the pivotal support shaft portion 22 constituting the displaceable shaft 7 which is off the support shaft portion 21. The inner diameter of this receiving side oil supply path 41 is large in the opening end portion thereof which is the upstream end and small in the inner portion thereby which is the downstream end. That is, in the case of the present embodiment, a large-diametered portion 50 is formed in the opening end portion of the receiving side oil supply path 41 to thereby make the inner diameter of the upstream end opening of this receiving side oil supply path 41 large. In the case of the present embodiment, design is made such that by the inner diameter of the upstream end opening of the receiving side oil supply path 41 being thus made large, the upstream end opening of the receiving side oil supply path 41 and the downstream end opening of the send-in side oil supply path 39 provided on the trunnion 6 side remain opposed to each other, irrespective of the pivotal displacement of the pivotal support shaft portion 22 about the support shaft portion 21.

Again in the case of the structure of the present embodiment constructed as described above, much of the lubricating oil discharged from the downstream end of the send-in side oil supply path 39 is sent into the receiving side oil supply path 41 without being lost into the surroundings to thereby lubricate the radial needle bearing 25 and the thrust ball bearing 26 sufficiently. Also, in order to effect the delivery of the lubricating oil efficiently between these two oil supply paths 39 and 41, it is not necessary to assemble any separate parts especially and therefore, it never happens that the assembling work becomes cumbersome and the cost increases. It hardly happens that the degree of freedom of the designing of the thrust needle bearing 27 is lost and therefore, the load capacity of the needle roller thrust bearing can be secured sufficiently.

Figure 4:
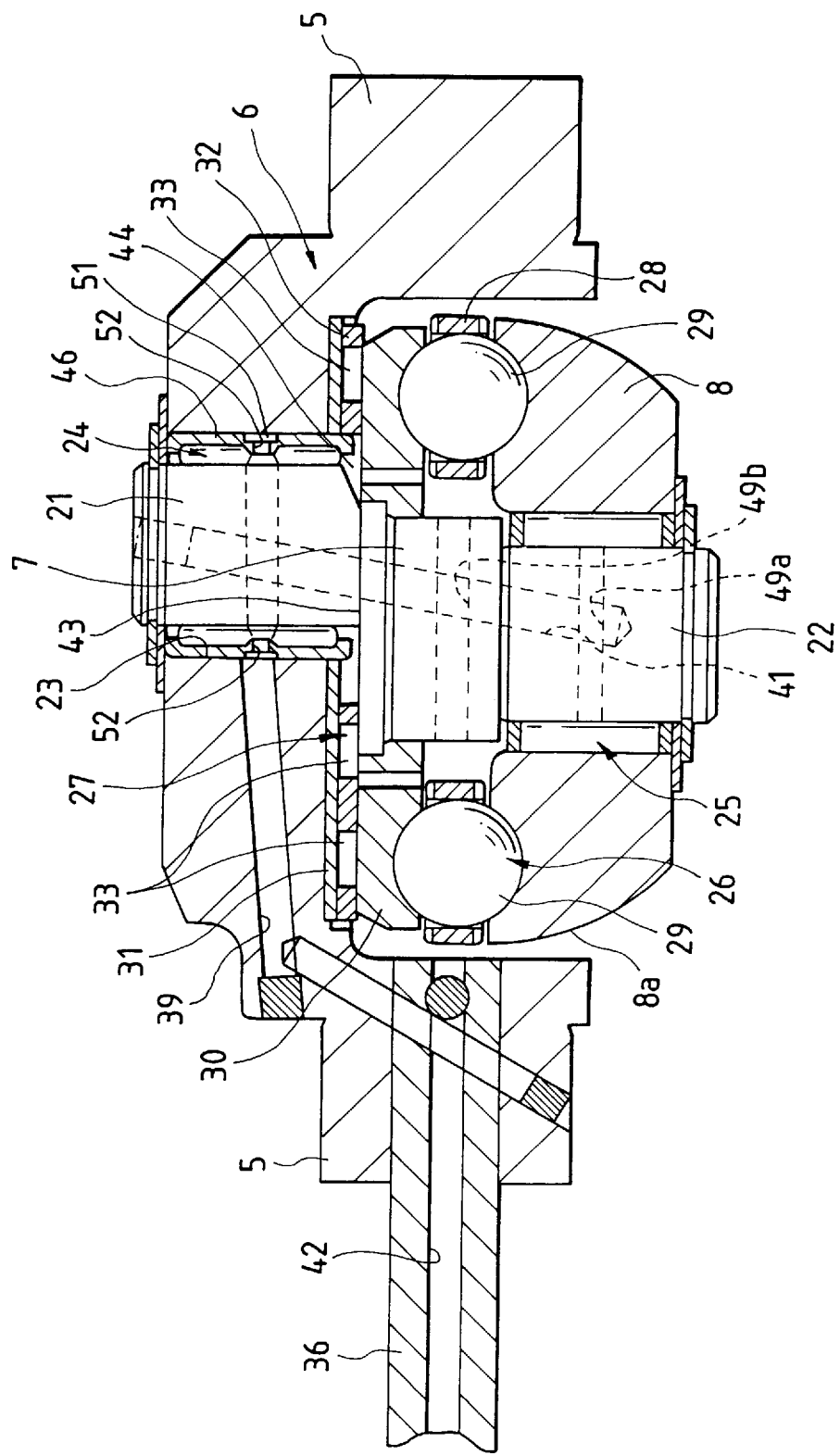
FIG. 4 is a cross-sectional view of the essential portions of a third embodiment of the present invention.
Figure 5:
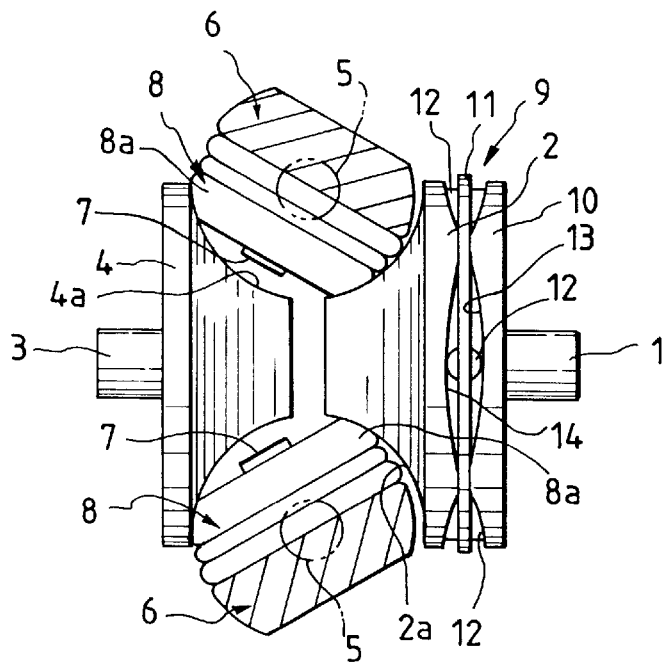
FIG. 5 is a side view showing the basic construction of a prior-art toroidal type continuously variable transmission in the state of maximum deceleration.
Figure 6:
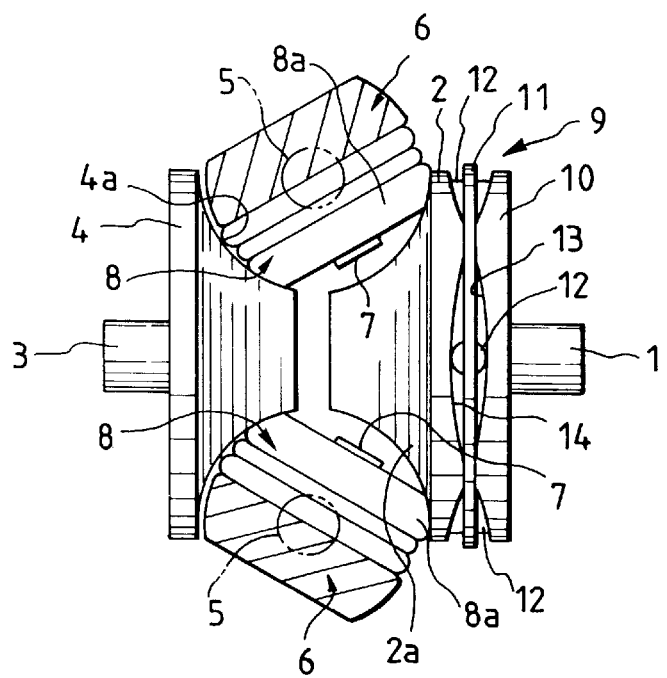
FIG. 6 is a side view of the transmission of FIG. 5 in the state of maximum acceleration.
Figure 7:
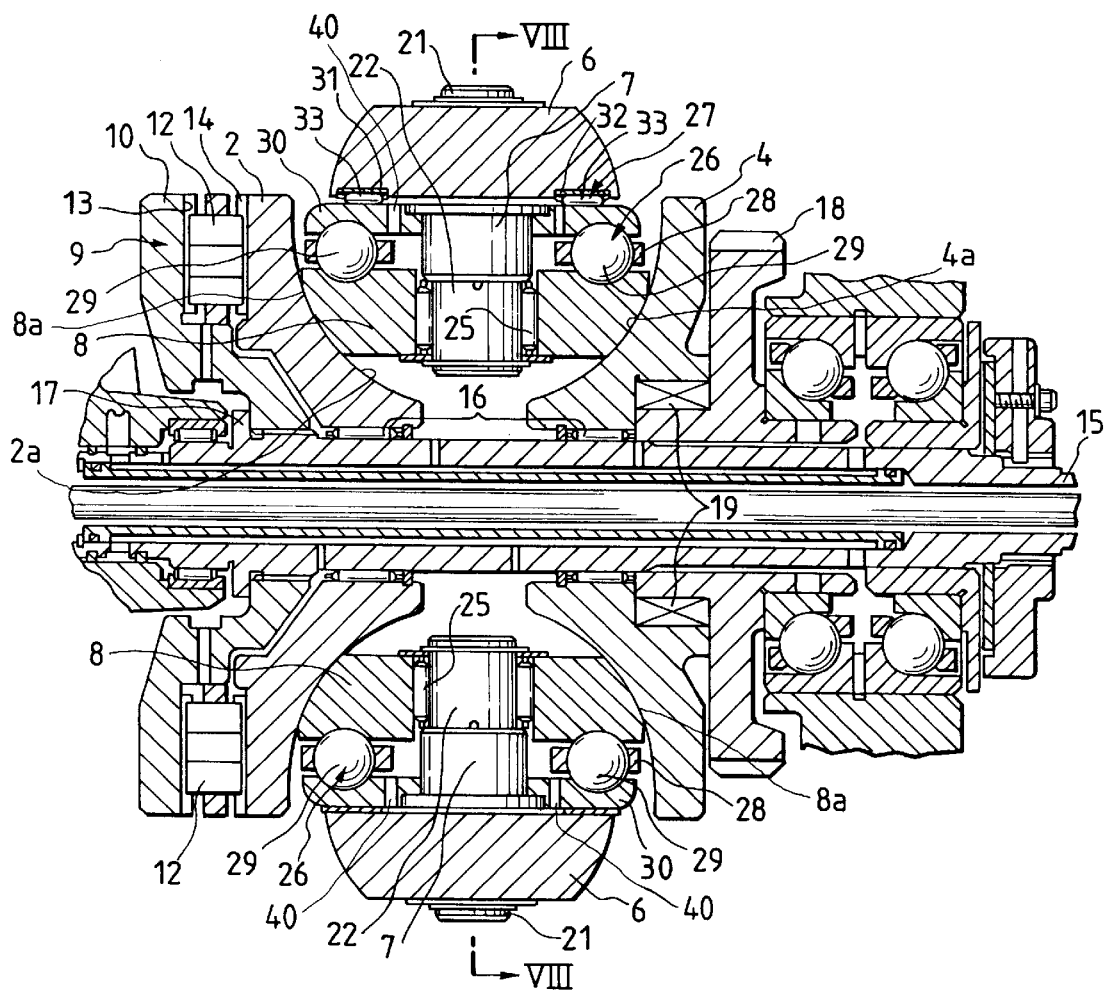
FIG. 7 is a cross-sectional view showing an example of the specific structure according to the prior art.
Figure 8:
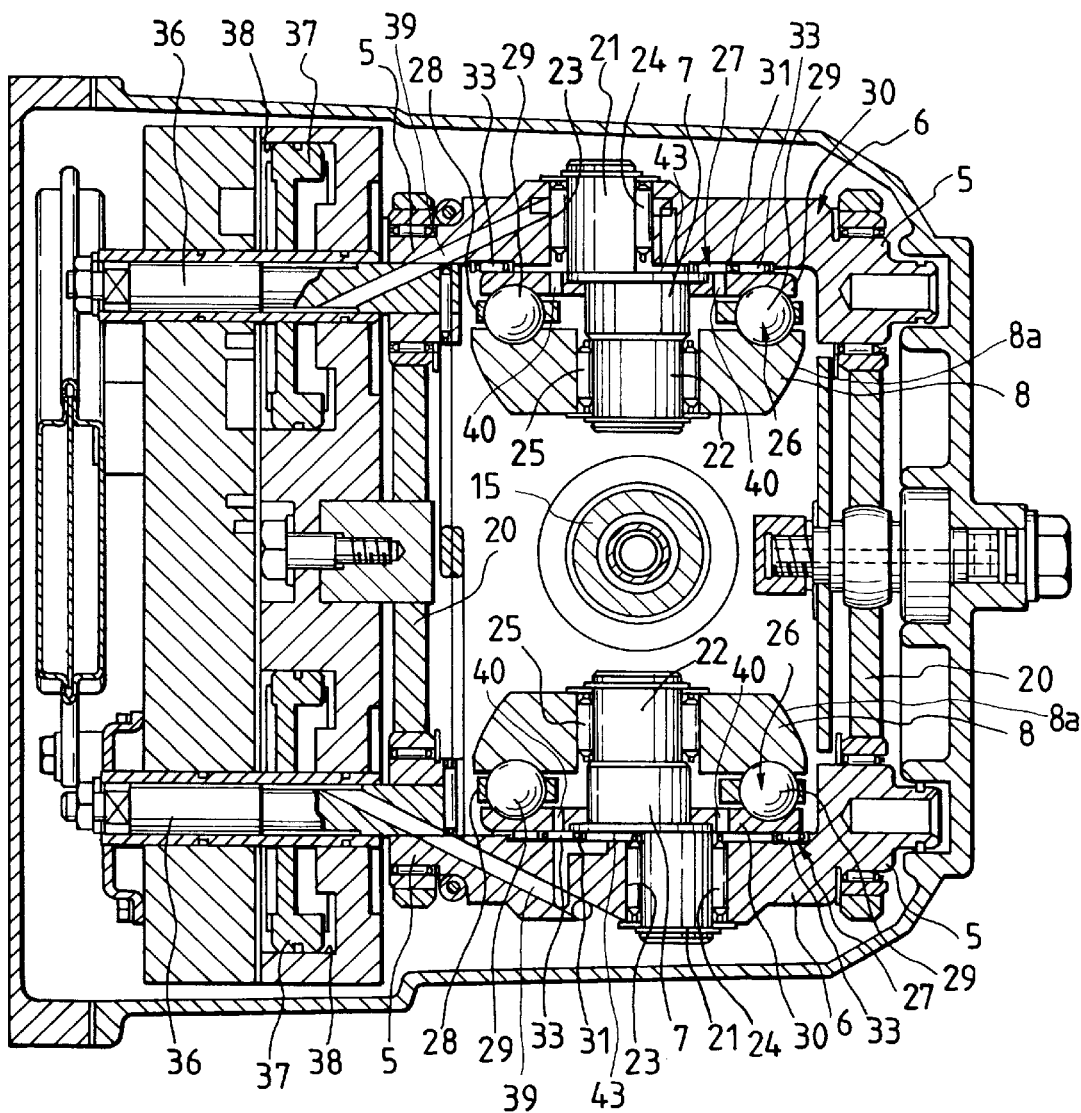
FIG. 8 is a cross-sectional view taken along the line VIII—VIII of FIG. 7.

FIG. 4 shows a third embodiment of the present invention. In the case of this embodiment, the receiving side oil supply path 41 passes through the interior of the displaceable shaft 7 to the inside of the support shaft portion 21 and opens to the outer peripheral surface of the intermediate portion of this support shaft portion 21. The downstream end of the send-in side oil supply path 39 formed in the trunnion 6 and the upstream end of the receiving side oil supply path 41 communicate with each other through the interior of the radial needle bearing 24. That is, in order to pivotally support the support shaft portion 21, the radial needle bearing 24 provided between the inner peripheral surface of the circular hole 23 formed in the trunnion 6 and the outer peripheral surface of the support shaft portion 21 is provided by a double row needle bearing comprising needles disposed in double rows. A concave groove 51 is formed over the full periphery of the outer peripheral surface of the intermediate portion of the outer race 46 constituting the radial needle bearing 24, and this concave groove 51 and the downstream end opening of the send-in side oil supply path 39 communicate with each other. Through-holes 52, 52 for communicating the concave recess 51 with the inner peripheral surface of the outer race are formed at a plurality of circumferential locations in the intermediate portion of the outer race 46. Further, the upstream end of the receiving side oil supply path 41 opens to a location on the outer peripheral surface of the intermediate portion of the support shaft portion 21 which can be opposed to the through-holes 52, 52.

Again in the case of the structure of the present embodiment constructed as described above, much of the lubricating oil discharged from the downstream end of the send-in side oil supply path 39 and having lubricated the radial needle bearing 24 is sent into the receiving side oil supply path 41 without being lost into the surroundings, and lubricates the radial needle bearing 25 and the thrust ball bearing 26 sufficiently. Also, in order to effect the delivery of the lubricating oil efficiently between the two oil supply paths 39 and 41, it is not necessary to assemble any separate parts especially and therefore, it never happens that the assembling work becomes cumbersome and the cost increases. It hardly happens that the degree of freedom of the designing of the thrust needle bearing 27 is lost and therefore, the load capacity of the needle roller thrust bearing can be secured sufficiently.

The toroidal type continuously variable transmission of the present invention is constructed and acts as described above and therefore, it becomes possible to sent a sufficient quantity of lubricating oil into the rolling bearing supporting the power roller rotating at a high speed while receiving a high load. Also, the load capacity of the needle roller thrust bearing provided between the inner side of the trunnion and the outer side of the thrust race can be sufficiently secured without the assembling work or the like being made cumbersome. This can contribute to improvements in the durability and reliability of the toroidal type continuously variable transmission and to the lower price thereof.

What is claimed is:

1. A toroidal type continuously variable transmission provided with first and second disc rotatably supported coaxially with each other with their inner sides opposed to each other, a trunnion pivotally movable about a pivot shaft lying at a twisted position relative to the center axes of said first and second discs, a displaceable shaft comprising a support shaft portion and a pivotal support shaft portion eccentric with respect to each other, said support shaft portion being rotatably supported on said trunnion, said pivotal support shaft portion being protruded from the inner side of said trunnion, a power roller rotatably supported around said pivotal support shaft portion through a rolling bearing and sandwiched between the inner sides of said first and second discs, a needle roller thrust bearing provided between the outer side of a thrust race constituting said rolling bearing and the inner side of said trunnion, and supporting a load in a thrust direction applied from said power roller to said thrust race and yet permitting the displacement of said thrust race relative to said trunnion, a receiving side oil supply path provided in said pivotal support shaft portion, and a send-in side oil supply path provided in said trunnion, the upstream end of said receiving side oil supply path opening to that portion of the base end surface of the pivotal support shaft portion which is off said support shaft portion, the downstream end of said send-in side oil supply path opening to the inner side of said trunnion, characterized in that a thrust sliding bearing is provided between the inner side of said trunnion and that portion of the base end surface of said pivotal support shaft portion which is off said support shaft portion, and a through-hole for communicating said receiving side oil supply path and said send-in side oil supply path with each other is provided in that portion of said thrust sliding bearing which is aligned with the upstream end opening of said receiving side oil supply path and the downstream end opening of said send-in side oil supply path.

2. A toroidal type continuously variable transmission provided with first and second discs rotatably supported coaxially with each other with their inner sides opposed to each other, a trunnion pivotally movable about a pivot shaft lying at a twisted position relative to the center axes of said first and second discs, a displaceable shaft comprising a support shaft portion and a pivotal support shaft portion eccentric with respect to each other, said support shaft portion being rotatably supported on said trunnion, said pivotal support shaft portion being protruded from the inner side of said trunnion, a power roller rotatably supported around said pivotal support shaft portion through a rolling bearing and sandwiched between the inner sides of said first and second discs, a needle roller thrust bearing provided between the outer side of a thrust race constituting said rolling bearing and the inner side of said trunnion, and supporting a load in a thrust direction applied from said power roller to said thrust race and yet permitting the displacement of said thrust race relative to said trunnion, a receiving side oil supply path provided in said pivotal support shaft portion, and a send-in side oil supply path provided in said trunnion, the upstream end of said receiving side oil supply path opening to that portion of the base end surface of the pivotal support shaft portion which is off said support shaft portion, the downstream end of said send-in side oil supply path opening to the inner side of said trunnion, characterized in that the inner diameter of the end opening of the receiving side oil supply path opening to that portion of the base end surface of said pivotal support shaft portion which is off said support shaft portion is made large to thereby keep the end opening of said receiving side oil supply path and the end opening of said send-in side oil supply path opposed to each other, irrespective of the pivotal displacement of said pivotal support shaft portion about said support shaft portion.

3. A toroidal type continuously variable transmission provided with first and second discs rotatably supported coaxially with each other with their inner sides opposed to each other, a trunnion pivotally movable about a pivot shaft lying at a twisted position relative to the center axes of said first and second discs, a displaceable shaft comprising a support shaft portion and a pivotal support shaft portion eccentric with respect to each other, said support shaft portion being rotatably supported on said trunnion, said pivotal support shaft portion being protruded from the inner side of said trunnion, a power roller rotatably supported around said pivotal support shaft portion through a rolling bearing and sandwiched between the inner sides of said first and second discs, a needle roller thrust bearing provided between the outer side of a thrust race constituting said rolling bearing and the inner side of said trunnion, and supporting a load in a thrust direction applied from said power roller to said thrust race and yet permitting the displacement of said thrust race relative to said trunnion, a receiving side oil supply path provided in said pivotal support shaft portion, and a send-in side oil supply path provided in said trunnion, characterized in that said receiving side oil supply path passes through the interior of said displaceable shaft and opens to the outer peripheral surface of the intermediate portion of said support shaft portion, and the downstream end of said send-in side oil supply path and the upstream end of said receiving side oil supply path communicate with each other through the interior of a radial bearing provided between the inner peripheral surface of a circular hole formed in said trunnion to pivotally support said support shaft portion and the outer peripheral surface of said support shaft portion.

* * * * *